(No Model.)
J. A. MACK & C. HANSON.
VEHICLE REACH.
No. 331,310. Patented Dec. 1, 1885.
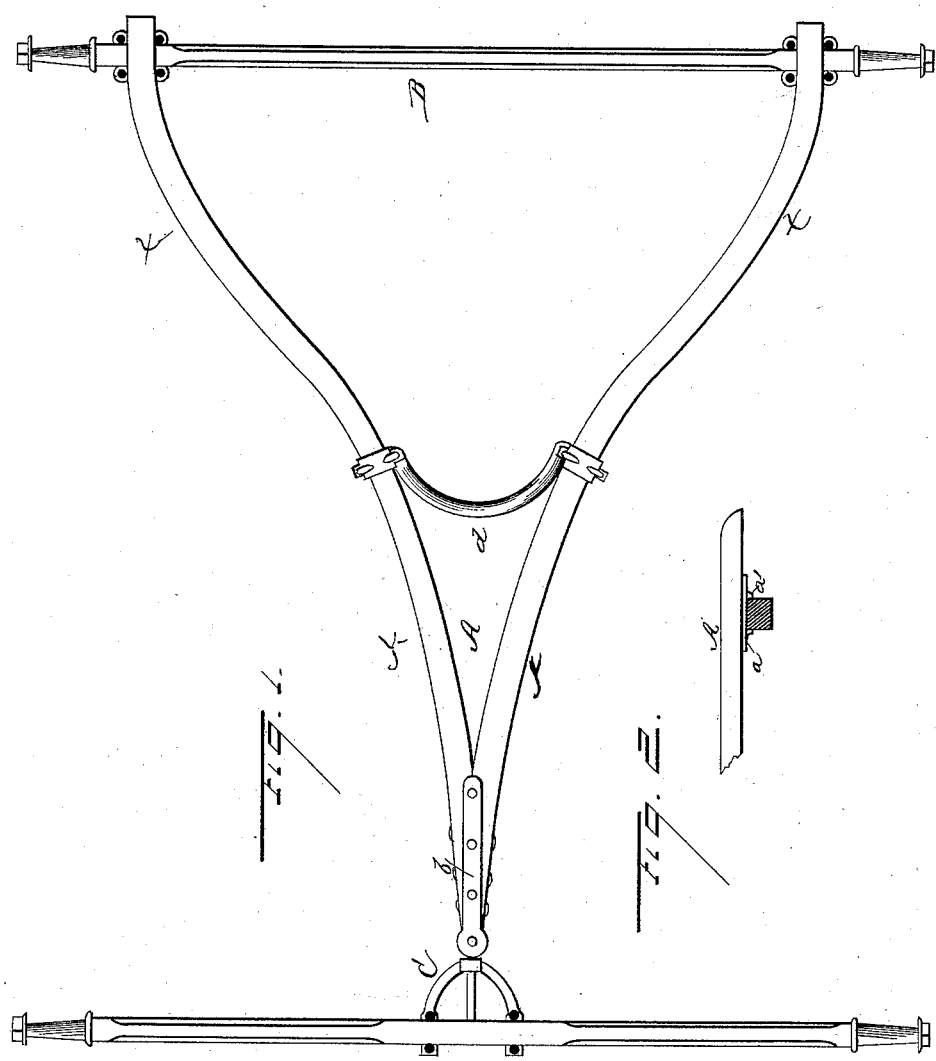

UNITED STATES PATENT OFFICE.

JACOB ANSEL MACK AND CHRISTIAN HANSON, OF MADISON, WISCONSIN.

VEHICLE-REACH.

SPECIFICATION forming part of Letters Patent No. 331,310, dated December 1, 1885.

Application filed December 4, 1883. Serial No. 113,499. (No model.)

*To all whom it may concern:*

Be it known that we, JACOB A. MACK and CHRISTIAN HANSON, citizens of the United States, residing at Madison, in the county of Dane and State of Wisconsin, have invented certain new and useful Improvements in Vehicle-Reaches, of which the following is a specification, to wit:

This invention relates to an improvement in vehicle-reaches; and it consists in the peculiar construction and arrangement of the same, substantially as and for the purpose hereinafter more fully described.

In order to enable others skilled in the art to which our invention appertains to make and use the same, we will now proceed to describe its construction, referring to the accompanying drawings, in which—

Figure 1 is a plan view of our invention; and Fig. 2 is a side view of the rear end of the reach, showing the plate for securing it to the axle.

A represents a vehicle-reach, composed of two pieces of wood of straight grain, bent in compound curves $x\,y$, having their rear ends spread apart and clipped to the rear axle, B, close to its shoulders or skeins. The ends of the reach rest upon the top of the axle, and are each provided with a metal plate, $a$, having small lugs or projections $a'$, which clasp the axle and prevent the reach from being pulled out of place should the securing-clips shake loose. The forward ends of the bars A A, forming the reach, are bolted together and provided with metal cap-plates $b$ above and below, which serve to secure it firmly and form a strong connection with the coupling C. Just in rear of the point at which the reach-bars are spread apart they are provided with a brace, $d$, clipped to the reach, which strengthens it and prevents its being pulled out of shape. This form of reach makes a much lighter and firmer connection than the ordinary straight reach and its braces, and, being clipped to the rear axle so near its ends, gives a straight and positive pull, not liable to allow one end of the axle to give back and prevent the rear wheels from trailing, while the plate $a$, secured to its under side, clasps the axle and prevents any give to the latter in case of a loose clip.

It is obvious that instead of the two lugs $a'$ only one may be used, entering a recess in the axle, and accomplishing the same purpose.

It is readily seen that, if desired, the brace $d$ may be placed at or much nearer the junction of the two parts of the reach than is here shown.

The form in which the reaches are bent so as to have the curves $x\,y$ allows the force to be applied at either end, and lessens the shock without destroying the natural shape or throwing wagon out of track.

Having thus fully described our invention, what we claim as new, and desire to secure by Letters Patent, is—

The reach herein described, consisting of two pieces of wood bent in compound curves $x\,y$, having their forward ends firmly secured together and braced by the brace $d$, clipped to the reach, and their rear ends spread apart and secured to the axle near its shoulders, and provided with a bearing-plate having one or more lugs engaging with the axle, all constructed, combined, and arranged to operate substantially as and for the purpose set forth.

In testimony whereof we affix our signatures in presence of two witnesses.

JACOB ANSEL MACK.
CHRISTIAN HANSON.

Witnesses:
CHAS. GEO. MAYERS,
RUFUS B. SMITH.